Patented Jan. 21, 1947

2,414,760

UNITED STATES PATENT OFFICE 2,414,760

SELECTIVE POLYMERIZATION OF MONOOLEFINS

Henry C. Mottern, Hillside, N. J., assignor to Standard Oil Development Company, a corporation of Delaware No Drawing. Application January 1, 1944, Serial No. 516,702

6 Claims. (Cl. 260—683.15)

The present invention relates to the polymerization of monoolefins to produce higher boiling polymers thereof through the use of a catalyst comprising benzene sulfonic acid. More particularly, the invention relates to a process of selectively polymerizing the tertiary monoolefins from mixtures containing tertiary and straight chain monoolefins so as to remove as the polymer from the mixture only the tertiary monoolefin, using benzene sulfonic acid as the catalyst. And more particularly, the invention is concerned with the use of aqueous solutions of benzene sulfonic acid in contrast to the use of concentrated or 100% benzene sulfonic acid.

In the past, numerous olefin polymerization reactions have been initiated and catalyzed by the use of concentrated or 100% benzene sulfonic acid. However, no tendency has been noted in these reactions toward a selective removal of more reactive olefins while leaving substantially unreacted the less reactive olefins in admixture therewith. In addition to the use of at least commercial grade benzene sulfonic acid, that is, benzene sulfonic acid undiluted with water, numerous processes have been devised for the use of sulfuric acid as a selective polymerization agent for monoolefins. Both of these catalysts, however, have certain disadvantages, principally residing in the fact that they are not entirely stable when employed in highly concentrated form. Thus, for example, excessive degradation of the catalyst mass is noted in the case of benzene sulfonic acid in U. S. Patent No. 2,303,769, patented December 1, 1942, where it is indicated that large quantities of sulfur dioxide were evolved when employing concentrated benzene sulfonic acid as the olefin polymerization catalyst. Also, when using sulfuric acid as the catalyst for the polymerization of olefins, much of the catalyst is degraded and lost through its reactivity with the olefins to produce sulfuric acid esters, sulfates, sulfonates and the like, these by-products or degradation products being extremely difficult to segregate and discard, and they also cause difficulties in the actual carrying out of the polymerization reactions.

Furthermore, in using sulfuric acid as a selective polymerization catalyst it has been found necessary, in order to obtain a relatively pure tertiary olefin polymer, to allow considerable quantities of the tertiary olefin to remain unconverted along with the straight chain olefins in order to be sure not to contaminate the final product with copolymer and interpolymer as between the tertiary olefins reacting with the straight chain olefins. In the so-called "cold acid polymerization process," although selectivity of the order of 95% may be attained, the final stage in the process requires the separation of the hydrocarbon solution from the aqueous acid phase and this is preceded by a heating step in which the sulfuric acid extract is heated in order to form the polymer. Such a process, however, has the disadvantage that the sulfuric acid forms side reactions during this heating process, causing an undue amount of sulfonation of the olefins, and thus results in a lower overall yield of the desired polymer than would be the case if sulfuric acid were less reactive under the conditions obtaining.

It is an object of the present invention to design a highly selective polymerization process in which tertiary olefins are removed from their mixtures with straight chain olefins and polymerized in the presence of benzene sulfonic acid while inherently avoiding in so far as possible an excessive degradation of the catalyst, thus prolonging catalyst life. It is a further object of the invention to provide a unitary process of securing desirable tertiary olefins polymers by selectively removing tertiary olefins from mixtures containing the same in conjunction with straight chain olefins and to substantially completely so remove these tertiary olefins without removing any of the straight chain olefins during the operation. Other objects of the invention will be apparent upon a fuller understanding of the invention.

It has now been discovered that hydrocarbon mixtures containing substantial amounts of tertiary olefins and straight chain olefins, either primary or secondary in character, may be selectively treated through intimate contact with an aqueous benzene sulfonic acid solution to remove substantially all of the tertiary olefin without at the same time removing any of the secondary or primary olefins. In particular, it has been discovered that either a multi-stage, single stage, or counter-current operation may be carried out successfully using an aqueous solution of benzene sulfonic acid wherein tertiary base olefins are selectively removed from their mixtures with straight chain olefins and, either in the same operation or in a subsequent step, polymerized to the dimers and trimers of the tertiary base olefins. It has been discovered that this relatively selective reaction may be successfully carried out if between about 50% and about 75% aqueous benzene sulfonic acid is employed as the catalyst and absorption medium. It has further been discovered that the temperatures of operation are important and vary as between the different types of feed stocks and strengths of acid employed. The feed stocks employed may be those customarily encountered in petroleum refineries wherein refinery C$_4$ cuts, refinery C$_5$ cuts, field butanes and the like are available. Any mixture that contains substantial quantities of both tertiary and straight chain monoolefins and in which the various olefins have substantially the same number of carbon atoms in the molecule is suitable for processing according to the present operation. Thus, for example, a typical refinery C$_4$ cut having the following composition is suitable:

| | Weight percent |
|---|---|
| Isobutylene | 17.5 |
| Normal butylenes | 35.7 |
| Butanes | 44.3 |
| C$_5$+ | 2.5 |

C$_5$ cuts containing the amylenes, both branched and straight chain, are also suitable, likewise, a partially dehydrogenated field butane or the C$_4$ and/or C$_5$ fractions obtained from thermal or catalytic cracking operations, from reforming operations, etc., may also be employed. In fact, any mixture containing substantial amounts of straight chain and tertiary olefins having the same number of carbon atoms in the molecule is suitable for use in the present process.

The selective removal and polymerization of the tertiary monoolefin from these feed stocks is accomplished in either one of two types of operation. The tertiary-olefin-containing hydrocarbon mixture is contacted with an aqueous solution of between about 50% and about 75% benzene sulfonic acid at temperatures of between about 30° C. and about 90° C. and under at least autogenous pressures which cause the hydration of the tertiary olefin to the corresponding alcohol while permitting the straight chain olefins to remain substantially unreacted. The resulting alcohol, being soluble in the aqueous acid phase, is removed with the aqueous acid from the contacting zone and separated together with the unreacted hydrocarbon mixture, and separated therefrom, followed by a separate and independent heating step in which the aqueous acid solution is heated in a suitable vessel to a temperature between about 100° C. and about 140° C. for a period of time ranging roughly between about 30 seconds and about 2 hours or until such time as to insure complete polymerization of the tertiary monoolefin content of the aqueous acid phase. The above-specified temperature is particularly employed when using a feed stock of a cracked refinery C$_4$ cut. If, however, a cracked C$_5$ cut is employed, a temperature ranging between about 20° C. and about 35° C. is employed in the first stage. The time of contact in the first stage may vary between about 20 and about 60 minutes, preferably between about 35 and about 40 minutes, and the olefin to acid molar ratio during the absorption stage ranges between about 1:1 and about 1:1.5, although the relative amounts of acid and hydrocarbon may vary widely from this range, providing the contact time, temperatures and pressures are correlated to give a substantially complete absorption of the tertiary monoolefin in the feed stock into the aqueous acid. The absorption or extraction stage of the process may be carried out in a variety of ways. Thus, for example, the absorption of the tertiary monoolefin may be accomplished using a liquid-liquid contact, that is, in which the feed stock is liquefied and of course the aqueous benzene sulfonic acid is in a liquid state. A further variation resides in the use of a vaporized or gaseous feed stock and a liquid aqueous acid catalyst phase. The degree of absorption of the tertiary olefin to a large extent requires an intimate contact of the hydrocarbon feed with the acid. This may be accomplished in a number of ways, such as by mechanical agitation through the use of jets of restricted internal diameter, turbo mixers, mechanical mixing pumps, or other suitable mechanical devices. In particular, a countercurrent flow is desirable where either liquid-liquid or vapor-liquid contacting is maintained. This may be carried out by permitting the hydrocarbon vapors or liquids to flow upwardly through a column while aqueous benzene sulfonic acid flows downwardly therethrough. Not only a single contacting chamber may be used, but a plurality of contacting chambers connected in series may also be employed wherein, in general, countercurrent flow is maintained in each contacting chamber, and in the contacting system in general. Suitable superatmospheric pressures may be employed to maintain a liquefied feed stock if necessary. In a vapor-liquid extraction, the hydrocarbon mixture in vapor phase flows through the column of the aqueous acid held at extraction temperatures, and the rate of addition or throughput of the hydrocarbon vapors is regulated to allow for the above-indicated contact times. In all such methods of contacting it is essential that the acid concentration and the temperatures be held within the ranges required for the absorption only of the tertiary monoolefin in the aqueous phase and that this aqueous phase be segregated from the unreacted hydrocarbon mixture and subsequently heat-treated as above indicated to form the desired tertiary olefin polymers which are recovered from the reacted and polymerized mixture.

Still another method of operating the process of the present invention resides in the carrying out of the absorption and polymerization operation as a single step or simultaneous step by mixing the hydrocarbon mixtures such as a cracked refinery C$_4$ cut, and which contains substantial amounts of the tertiary monoolefin, with the required amount of the 50-75% aqueous benzene sulfonic acid at a temperature sufficient to complete the polymerization of the tertiary olefin while minimizing the formation of the alcohol under absorption conditions. The temperatures employed generally range between about 100° C. and 140° C., while the time of reaction is maintained between about 30 and about 120 minutes. The mixing of the hydrocarbon may be accomplished in a manner similar to that stated in connection with the first stage of the hereinbefore-described two-stage operation, that is, by employing a liquid-liquid contacting or a vapor-liquid contacting with the acid constituting a liquid phase in both instances. Suitable equipment would include the use of towers containing packing material such as is customarily employed in securing intimate contact of liquids with gases, etc., or the use of plate towers such as are employed in fractionating columns, or any other suitable devices for securing intimate contact of the liquid phases or of the gas-liquid phases. Such a packed tower may be flooded with aqueous benzene sulfonic acid solution, and either liquid or gaseous hydrocarbon feed may be passed therethrough or injected into the tower mass at suitable places. The single-stage polymerization process is also successfully accomplished if the aqueous catalyst phase, that is, the 50-75% aqueous benzene sulfonic acid, is deposited or sorbed on a suitable porous carrier such as pumice, activated charcoal, Kieselguhr, Activated Alumina, bentonite, bauxite and the like, and either the vapors of the feed stock or the liquefied feed stock, under suitable superatmospheric pressure to maintain liquid phase, is contacted with this catalyst bed. It is necessary, however, in order to maintain the strength of the catalyst, to vaporize small quantities of water with the hydrocarbon feed and allow the hydrous hydrocarbon mixture to pass into the catalyst bed at a temperature between about 100° C. and about 140° C., with the water which is mixed with the hydrocarbon feed being proportional to the partial pressure developed by the catalyst at the temperature of polymerization. By operating in this manner, it is possible to maintain the concentration of the aqueous benzene sulfonic acid within the ranges required for carrying out the process. Otherwise a dehydration of the catalyst mass would result due to the vaporization and removal of water vapor from the catalyst mass due to its partial pressure under the temperatures obtaining. In large scale operations, small quantities of the corresponding alcohols and unpolymerized tertiary monoolefin may be recovered with the polymerization product, but these materials may be readily recycled to either the extraction process in a two-stage operation or to the polymerization process in a single stage operation to increase the production of the desired polymer.

The benzene sulfonic acid in the examples to be hereinafter more fully set forth and the benzene sulfonic acid to be employed in the process need not be C. P. grade but may be crude or commercial benzene sulfonic acid as well. The crude benzene sulfonic acid employed in the examples hereinafter set forth contained 89.6% by weight of benzene sulfonic acid, 4.5 weight percent of sulfuric acid, and 2.7 weight percent of water. A commercial grade of acid containing no more than about 8% sulfuric acid, or less if possible, is quite suitable, although C. P. grade acid may also be employed. The acid was diluted with water to give the desired concentration of benzene sulfonic acid for use in the examples.

It has been discovered that the liquid phase absorption of isobutylene from a refinery $C_4$ cut is one hundred per cent selective at a temperature of from 40° C to 50° C. and at an acid strength up to 75% benzene sulfonic acid. Substantially the same results have experimentally been obtained using a vapor phase absorption with a packed tower which substantially was flooded with benzene sulfonic acid of the desired concentration under the temperatures herein stated. It has also been determined experimentally that multi-stage absorption in series gives very little improvement in the rate of absorption of the isobutylene over that obtained in a single absorption operation. However, the $C_4$ naphtha from which the isobutylene has been stripped contains as little as 1.5% of isobutylene where a multi-stage series absorption operation is employed, yet no normal butylenes were found in the extract. Practically one hundred per cent recovery of isobutylene as polymer is attained when operating according to the heretofore-mentioned processes and the feed stock is substantially devoid of isobutylene to the extent that in most cases only about 0.7–1.5% concentration of isobutylene is retained in the final $C_4$ naphtha recovered from the process. A careful consideration of the benzene sulfonic acid shows no detectable change in its quality after use in the operation and it appears that less than 1% of the acid per cycle is lost through decomposition.

A fuller and more complete understanding of the invention can be had through a consideration of the following examples:

*Example 1*

A benzene sulfonic acid of the specific composition heretofore mentioned was contacted with a refinery $C_4$ cut of the specific composition heretofore mentioned by passing the refinery $C_4$ cut through a packed tower flooded with an aqueous benzene sulfonic acid solution, the refinery $C_4$ cut being in the vapor phase, while the benzene sulfonic acid was in liquid phase. The temperature was maintained at between about 40° C. and about 45° C. and the contact time ranged between about 20 and about 40 seconds. The acid concentration was between about 66 and about 70 weight percent of benzene sulfonic acid aqueous solution. The extract was found to contain 100% isobutylene and the percentage removed varied between about 75% and about 87%, with the feed stock containing on the order of 2.6 weight percent of isobutylene unremoved. It should be noted, however, that the longer contact times would increase the quantity of isobutylene removed since a large quantity of acid was involved and since the extract formed did not in any case exceed about 0.2 mol of isobutylene per mol of benzene sulfonic acid employed.

*Example 2*

Other absorption operations were employed in which the feed stock of refinery $C_4$ cut was maintained in liquid phase and charged to a steel bomb of about 600 cc. capacity at a pressure of 50–120 pounds per square inch gauge which was agitated by means of a mechanical shaker after the introduction of benzene sulfonic acid of about 70–71 weight percent. The temperature was maintained at about 38° C. and a contact time of between 10 and 20 minutes was maintained, employing mechanical agitation. The extract contained 100% isobutylene and the amount of isobutylene extracted ranged between 70% and 87%.

*Example 3*

A two-stage absorption operation was carried out in which 71% benzene sulfonic acid was used to extract the isobutylene content of the heretofore-mentioned refinery $C_4$ cut and wherein, in the first stage, a contact time ranging between about 30 and about 90 minutes was maintained, and wherein, in the second stage, the contact time ranged between 60 and 120 minutes. The temperature was maintained at about 38° C. and mechanical agitation was maintained. In one instance, the isobutylene was removed to a total of about 89%, and in the second instance, where 120-minute contact time was employed, the isobutylene was removed to the extent of about 92% of that contained in the feed stock. In each instance, 100% of isobutylene was found to be contained in the benzene sulfonic acid. The higher extraction temperatures, that is, of the order of 65° C., give higher selective isobutylene removal than can be obtained with sulfuric acid without incurring any appreciable loss of isobutylene during the operation as by-product or undesired product.

*Example 4*

Extracts prepared in accordance with Example 1 were heated in a steel bomb immersed in an oil bath maintained at a temperature of about 135° C. for a period of about 45 minutes, at the end of which time 95% of the olefin, as an average, was recovered as polymer, and 80%, as an average, of this polymer boiled in the diisobutylene-triisobutylene range.

*Example 5*

Extracts of isobutylene and 70% aqueous benzene sulfonic acid were prepared and heated under a pressure of 105 pounds per square inch gauge to a temperature of about 100° C. for a period ranging between about 2 and about 4 hours. The product recovered comprised 1.5 weight per cent isobutylene, between 4.1% and 5.8% of tertiary butyl alcohol and between 74.2% and 90.9% polymer. Based upon other experimental data wherein heating times were lower, the catalyst acidity lower and the pressure lower, indications were that the polymer formation was decreased, or, to put it another way, the polymer was increased by increasing acidity and applying pressure, practically quantitative yields of polymer being obtained under the optimum reaction conditions. Considerably higher contact times are, however, desirable since the rate of polymerization of the benzene sulfonic acid extract is lower than that customarily found in the case of sulfuric acid.

Having thus fully described and illustrated the nature of the invention, what is desired to be secured by Letters Patent is:

1. A process of selectively polymerizing isobutylene contained in a refinery $C_4$ fraction containing substantial amounts of normal butylenes and isobutylene, in a two-stage process which comprises as a first stage the selective extraction of isobutylene from the said $C_4$ fraction by intimately contacting the same with an aqueous benzene sulfonic acid solution of between about 50% and about 75% concentration, at a temperature between about 40° and about 65° C. with a contact time between about 20 and about 60 minutes so as to form an extract only of the isobutylene in the aqueous benzene sulfonic acid, directly followed by a second stage in which, without further treatment, the acid extract of the first stage is subjected to a temperature between about 100° and about 140° C. under superatmospheric pressure to produce isobutylene polymer.

2. The process of claim 1 wherein the acid extract is separated from hydrocarbon raffinate, prior to the second stage.

3. A process of selectively polymerizing tertiary $C_4$—$C_5$ olefins contained in a refinery $C_4$—$C_5$ fraction containing substantial amounts of normal $C_4$—$C_5$ olefins, and tertiary $C_4$—$C_5$ olefins, in a two stage process which comprises as a first stage the selective extraction of tertiary olefin from the said $C_4$—$C_5$ fraction by intimately contacting the same with an aqueous benzene sulfonic acid solution of between about 50% and about 75% concentration, at a temperature between about 40° and about 65° C. with a contact time between about 20 to about 60 minutes so as to form an extract only of tertiary olefin in the aqueous benzene sulfonic acid, directly followed by a second stage in which, without further treatment, the acid extract of the first stage is subjected to a temperature between about 100° and about 140° C. under superatmospheric pressure to produce tertiary olefin polymer.

4. The process of claim 3 wherein the acid extract is separated from hydrocarbon raffinate prior to the second stage.

5. The process of claim 1 wherein the aqueous benzene sulfonic acid is sorbed on a porous carrier.

6. The process of claim 3 wherein the aqueous benzene sulfonic acid is sorbed on a porous carrier.

HENRY O. MOTTERN.